Patented May 26, 1931

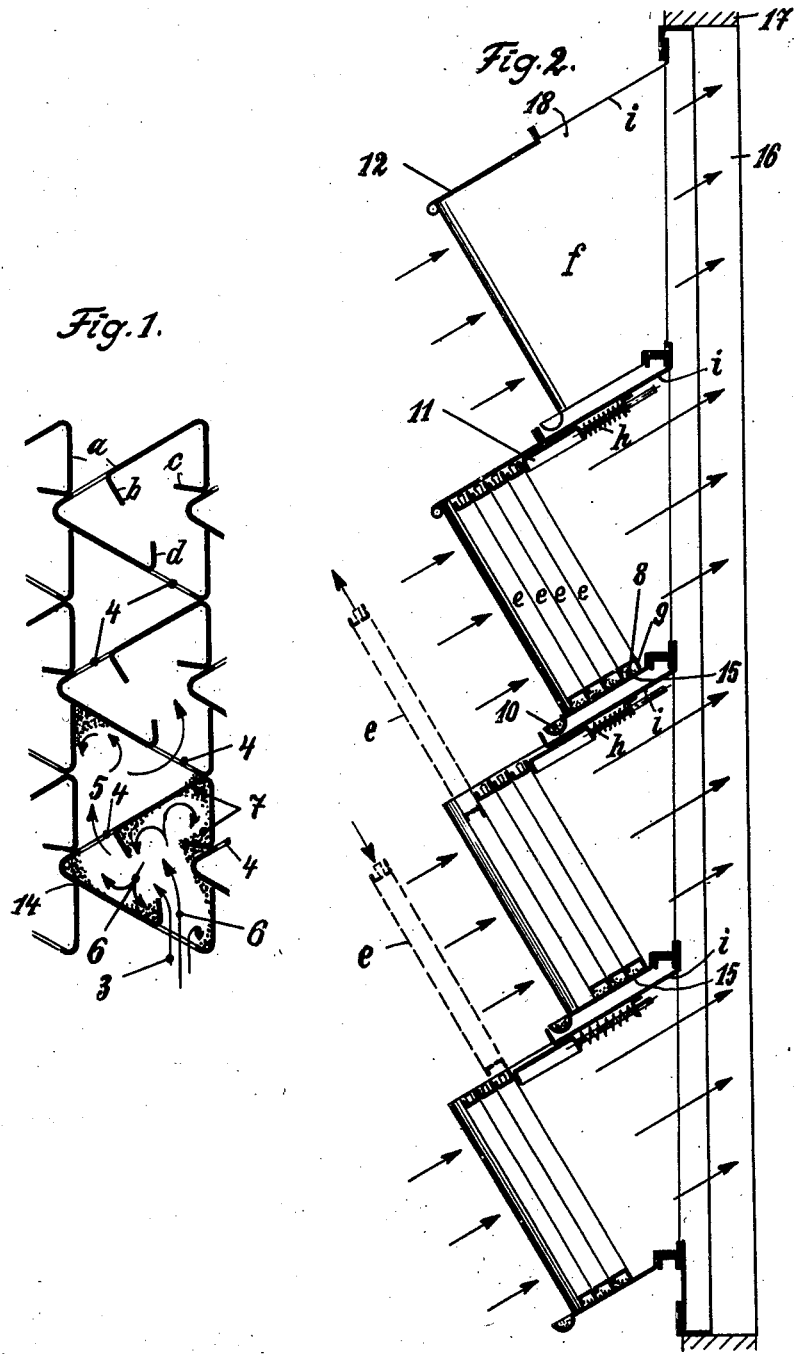

1,807,378

UNITED STATES PATENT OFFICE

ELEONORE BUDIL, BORN MEIXNER, OF BERLIN-TEMPELHOF, GERMANY

FILTER FOR AIR AND GASES

Application filed July 28, 1927, Serial No. 209,137, and in Germany July 31, 1926.

The invention relates to a filter for air and gases.

In the formerly employed systems of air-purification by rebounding action, it is characteristic, that one of these effects is gained at the expense of the other. So with some filters the air-resistance increases considerably under an increasing purifying-effect. This happens likewise in the reverse sense, so that the effective capacity-curve is relatively slightly rising.

Extensive experiments and analysis have proved that rebounding air-currents acted upon by inertia, continuity and capillarity will be transferred into whirling motions thus continuing their way more or less rotating. This is particularly strongly characterized in filters. Here the air is moving about in the filter-cells, if not sucked off towards the pure-air-side in form of dust-laden air. It is consequently obvious, that with hitherto known constructions of filters not being developed expressively under consideration of the said characteristics a high coefficient of resistance is opposed the relative capacity.

This drawback is eliminated perfectly by the present invention in causing the dust-laden air, flowing in uniform direction into the filter, to produce a systematically regulated whirling action, whereby a considerable reduction in resistance is obtained.

For this purpose I employ filtering elements composed of tubes arranged longitudinally side by side in a frame. Relatively short inlet and passage slots arranged in staggered order are formed in the said tubes. The material lugs which are produced in consequence of the slots are bent so that they are substantially partly in the same direction as the air or gas current, partly opposite thereto and partly obliquely thereto. Consequently there are numerous angles in which the current of air, to which a whirling motion is imparted by the said positions of the lugs, deposits the substances it entrains.

The tube sections employed in the present case as the filtering body may have any desired cross-section, therefore also a polygonal cross-section. Thus, a prismatic cross-section may be imparted thereto, and they may be slotted along one side. A longitudinal edge of an adjoining section tube may engage with the said slot, so that space is saved for the building up of the tubes in the filter frame, and further deviation surfaces and angles favoring the depositing of the substances entrained by the current are provided.

According to the invention there are generally several filter frames, hereunder called "caskets", arranged in series. They may be mounted in an oblique guide and exchangeable so that the filter frame which is disposed at the dust-air side, therefore that part of the filter which contains most dust, is drawn out at the top, whereupon the remaining frames or caskets are pushed forward, so that the second casket assumes the position of the first casket which has been removed. The latter is then cleaned and is reinserted in the said oblique guide at the last position, therefore on the pure air side. In order that the dust which has fallen out of the caskets in the oblique guide may be automatically removed, each casket is provided at its lower edge preferably with a scraping ledge extending over the whole width inclined of the guide and entraining the dust when the caskets are moved in the guide.

One mode of applying the principle of the invention is illustrated in the drawings, in which Fig. 1 is a cross-section of a part of a filter-element composed of tubes.

Fig. 2 is a cross-section of a filter, the magazines of which contain filtering caskets, consisting internally of tubes disposed in accordance with the arrangement shown in Fig. 1.

In the drawings, $a$, are tubes of prismatic cross-section, from the walls of which flaps $b$, $c$, $d$, have been stamped out and bent inward at an angle. The angles, under which these flaps are bent, are preferably different in order to enable the production of a regulated whirling-motion of the air or the like to be purified inside of the said tubes. The cross-section of the tubes may be different than that shown in the drawings. In the shown triangular shape, the points of the triangular profiles engage with the recesses 14 in the base of an adjacent triangle-profile, whereby the thickness of the frames or caskets e, composed of tubes (Fig. 2), is reduced. The dust-laden current 3 is sucked through the channels 4, disposed in staggered arrangement for the purpose of producing a lateral whirling-motion. With filter-caskets disposed in series and filling the filter-magazines f said channels in a manner not shown in the drawings may be reduced in cross-section thus, that tubes are disposed inside of a casket in series, in which the cross-section of the channels 4 is reduced gradually, or that in consecutively disposed caskets tubes are employed in which the widths of the channels differs in each casket from the width in the adjacent casket.

The indicated whirling-actions 5 show an intermittent motion of the numerous whirls towards each other, whereby counter-currents, having a retarding effect, are eliminated. It is furthermore impossible to suck in any directions of current unwhirled, viz. direct flowing air-currents 6 through.

According to Fig. 2, the tubes in the caskets, of which 4 are disposed in series in magazines f, run vertically. It is the object of this arrangement to maintain in a whirl the dust residue 7, which often does not adhere directly to the walls moistened with liquids of any desired viscosity, so that it sinks down in a whirling motion to the bottom and settles there. The path for the following dust air-current is hereby rendered effectively unobstructed for the same play.

The magazines f which several are arranged one above the other before an opening 16 of a wall 17 are formed by two side-walls 18, a coverplate i and a bottom-plate 15. Plates 15 and i are inclined for the purpose hereunder specified. To the plate i a cover 12 is hinged, which may be opened for the insertion or withdrawal of the caskets e.

The dust 8, discharged from the lower ends of the caskets e and gradually deposited in a dry state on the bottom 15 of the magazine, as well as the dust mixed with viscous liquids, is after removal of the front casket by the forward movement of the other caskets and simultaneously by the obstructing-respectively purifying-strips 9, fixed to the rear bottom edge of each casket, pushed forward and downwards, passing into a separating-trough 10 arranged at the outer edge of the magazine below. Upon the strongly forward inclined bottom surface 15 of the magazine, the viscous liquid residues still separated out from the different filter-caskets and the deposits of condensation collected in the filter, are simultaneously conveyed to the trough 10.

Besides the above described possibilities of returning dust, dust-binding liquid and condensed water the inclined disposition of the entire filter-system towards the dust-air-side is of extraordinary importance in so far, as the dust particles, separated from the walls of the tubes by the inavoidable vibrations of the filterplants erected in close vicinity of the engine-rooms, drop within the filter-system towards the dust-air side, viz. in a direction favourable to filtering.

By this inclined positon, falling of the consecutively following caskets during exchange of caskets, is prevented and a soft sliding movement of the same obtained free from vibrations. This disadvantage of impacts, which would in this instance cause the very dangerous loosening of bound dust-particles and carrying it over towards the pure air side, is hereby likewise prevented. The soft sliding of the caskets in the magazine and their tight fit in the latter are obtained by covering the narrow sides of the caskets with felt not shown in the drawing.

Another important characteristic of the invention consists therein, that in withdrawing the front-casket located on the dust-air side and saturated with dust and during insertion of a fresh casket capable of absorbing dust on the pure air side, passing of unfiltered air from the dust-air side to the pure air side is prevented by a slide 11 mounted below the plate i and influenced by a spring h. This slide abuts on the pure air side with the casket parcel and is moving forward with the same on the dust-air side after removal of the soiled front casket, so that no air-gap is produced, by way of which unpurified air could enter the pure air side.

The cover 12, provided on the top of the magazine for the sake of an harmonical finish, ensures further absolute packing of the magazine and has the effect, that an unintended entering of dust-air is even for a longer period made absolutely impossible.

I claim:

1. In a filter for air and gases, filtering-elements of tubes, from the walls of which tubes series of flaps are stamped out, disposed staggered towards each-other, said flaps being bent under different angles toward the inside of the said tubes.

2. In a filter, the combination of tubes provided with staggered passage-openings and flaps bent under different angles inward, and a frame holding the said tubes together, said frame being provided with a scraping ledge on the lower surface of the said frame.

3. In a filter, the combination of a magazine with exchangeable frames provided with scraping ledges on the lower surfaces and tubes arranged within said frames and provided with staggered passage-openings and with flaps bent inward under different angles.

4. In a filter, the combination of a magazine with exchangeable frames provided with scraping ledges on the lower surfaces, tubes arranged within said frames and provided with staggered passage-openings and with flaps bent inward under different angles, and means for air-tight packing of the magazine in the rear of the frames.

5. In a filter, the combination of a magazine with exchangeable frames, provided with scraping ledges on the lower surfaces, tubes arranged within said frames and provided with staggered passage-openings and with flaps bent inward under different angles, means for air-tight packing of the magazine in the rear of the frames, and a cover closing the magazine on the top.

6. In a filter, the combination of a magazine with exchangeable frames provided with scraping ledges on the lower surfaces, tubes arranged within said frames and provided with staggered passage-openings and with flaps bent inward under different angles, means for air-tight packing of the magazine in the rear of the frames, a cover closing the magazine at its top, and an inclined bottom in the magazine.

7. In a filter, the combination of a magazine with exchangeable frames provided with scraping ledges on the lower surfaces, tubes arranged within said frames and provided with staggered passage-openings and with flaps bent inward under different angles, means for air-tight packing of the magazine in the rear of the frames, a cover closing the magazine at its top, an inclined bottom in the magazine, and a receiving-trough disposed in front of the inclined magazine-bottom.

8. In a filter, the combination of an inclined disposed magazine being provided with an inclined bottom and with exchangeable frames provided with scraping ledges on the lower surfaces, tubes arranged within said frames and provided with staggered passage-openings and with flaps bent inward under different angles, a spring-influenced slide, a cover closing the magazine at its top, and a receiving-trough in front of the inclined magazine-bottom.

ELEONORE BUDIL, geb. MEIXNER.